3,579,573
OXIDATION OF α,β-UNSATURATED ALDEHYDES TO THE CORRESPONDING UNSATURATED CARBOXYLIC ACIDS

Dieter Gilde, Hanau am Main, and Edgar Koberstein, Konstanz, Germany, assignors to Deutsche Gold- und Silber-Scheideanstalt vormals Roessler, Frankfurt am Main, Germany
No Drawing. Filed Jan. 20, 1964, Ser. No. 338,610
Claims priority, application Germany, Jan. 29, 1963, D 40,744; Dec. 23, 1963, D 43,244
Int. Cl. C07c 51/26
U.S. Cl. 260—530                    6 Claims

ABSTRACT OF THE DISCLOSURE

Process for the production of α,β-unsaturated carboxylic acid by catalytic oxidation of α,β-unsaturated aldehydes in the gas phase with molecular oxygen using a mixture of phosphoric acid and vanadic acid in which the atomic ratio of phosphorus to vanadium is from 1:10 to 10:1 which may also contain antimony trioxide as oxidation catalyst.

---

The present invention relates to an improved process for the production of α,β-unsaturated carboxylic acids from the corresponding aldehydes.

The oxidation of aldehydes with molecular oxygen to form the corresponding carboxylic acids has been known for a long time but the application of such process to α,β-unsaturated aldehydes provided difficulties.

Recently processes have been developed for the oxidation of such unsaturated aldehydes which operate in the gas phase and employ vanadium compounds, among others, as catalysts. For example, a catalyst consisting of vanadium oxide, silver vanadate or a mixture of such compounds has been described in the literature for this purpose. The process employing vanadium oxide and silver vanadate as the catalyst as not only indicated by the literature but also by our own tests gives yields of about 43% with conversions of only 3 to 8% of the acrolein supplied to acrylic acid.

According to the invention, it was found that the yields of α,β-unsaturated carboxylic acids could be substantially improved if the oxidation of the α,β-unsaturated aldehydes is carried out with a mixture of phosphoric acid and vanadic acid as the catalyst. The atomic ratio of phosphorus to vanadium in such catalyst mixture can be from 1:10 to 10:1.

Acrolein and methacrolein preferably are employed as the starting unsaturated aldehydes.

The catalyst system employed according to the invention can, for example, be prepared by evaporating down a mixture of aqueous solutions of alkali metal or ammonium vanadate and phosphoric acid. The solid residues remaining are dried, calcined and, if desired, briquetted to provide a suitable form. A mixture of vanadic and phosphoric acid with silica as a carrier has proved especially advantageous. The commercially available silica gel or a silica sol or highly disperse silica can be used in the preparation of such supported catalytic masses.

The oxidation of the α,β-unsaturated aldehydes per se is carried out in the usual way in the gas phase by passing mixtures of the aldehyde with oxygen containing gases, preferably, with an addition of steam, over the granular catalyst. The pressure employed is atmospheric and the temperature employed is between 200 and 500° C., preferably between 250 and 400° C. An especially advantageous mode of carrying out the process, which in general is already known and therefore not claimed as such, resides in that the gases after being passed over the catalyst are recycled after condensing out the higher boiling acid and having the aldehyde and oxygen content replenished.

The following examples will serve to illustrate the invention.

EXAMPLE 1

35.7 g. of phosphoric acid (85%) and 36.1 g. of ammonium vanadate were dissolved in 300 cc. of warm water and 167 g. of a 30% silica sol added thereto. The mixture was boiled down to dryness while stirring and the residue granulated to a grain size of 0.6 to 1 mm. and heated for 2 hours at 540° C.

The catalyst was placed in a reaction tube provided with salt bath heating. An acrolein steam and air mixture in a molar ratio of 1:7:5 was passed over the catalyst at 387° C. as a maximum. With a period of contact of 0.5 second the acrolein conversion was 33.2% with an acrylic acid yield of 64.7% of theory.

EXAMPLE 2

200 g. of silica gel of a grain size of 0.6 to 1 mm. were impregnated with a solution of 49 g. of ammonium monovanadate and 48 g. of phosphoric acid (85%) in 500 cc. of water. The impregnated granules were dried and then heated 2 hours at 540° C.

An acrolein-steam-air mixture in a molar ratio of 1:5:5 was passed over such catalyst at 299° C. with a 2.4 second period of contact. The acrolein conversion was 48.1% with an acrylic acid yield of 53.4% of theory.

EXAMPLE 3

The following acrylic acid yields were obtained from an acrolein-steam-air mixture of a molar ratio of 1:5:5 with the following variations in the atomic ratios of phosphorus to vanadium in the catalyst and with a contact period of 2 seconds.

| Phosphorus: vanadium: | Acrylic acid yield, percent |
|---|---|
| 4:1 | 23 |
| 1:1 | 59 |
| 1:2 | 42 |

The catalysts employed are not always merely mixtures as definite compounds can also be formed, such as is the case in an atomic ratio of a phosphorus to vanadium of 1:2 when the compound $H_3PV_2O_9$ is formed.

According to the invention it furthermore was found that the selectivity of the phosphoric and vanadic acid catalysts could be improved significantly by an addition of 1 to 30 mol percent of antimony trioxide with reference to the phosphorus and vanadium oxide content. The increase in the aldehyde conversion and in the yield of α,β-unsaturated acid causes a substantial increase in the space-time yield. As a result, the production per liter of catalyst per hour in general increases about 30% as can be seen from the following table.

| Catalyst | Acrolein conversion, percent | Acrylic acid yield, percent | Space-time yield, g./l. catalyst and hour |
|---|---|---|---|
| Phosphoric-vanadic acid P:V=1:1 | 36.5 | 70 | 57.4 |
| Phosphoric-vanadic acid with 11 mol percent $Sb_2O_3$ | 47.5 | 71 | 75.7 |

The antimony trioxide containing catalyst system can be prepared in a known manner, for example, by evaporating down a mixture of an alkali metal or ammonium vanadate solution, phosphoric acid, mineral acid, preferably nitric acid, and antimony trioxide. The residue is then dried, calcined and, if desired, given a suitable shape by briquetting. Silica can be employed as a carrier for such catalysts. Such supported catalysts can be prepared with the aid of conventionally available silica gel or a silica sol or highly disperse silica.

EXAMPLE 4

234 g. of ammonium monovanadate were slurried up in 800 cc. of water and then 231 g. of 85% phosphoric acid added thereto (P:V ratio about 1:1). The resulting solution was added portionwise to a slurry of 32.4 g. of antimony trioxide in 100 cc. of concentrated nitric acid. The mixture was evaporated to dryness and the solid residue granulated and the desired grain fraction calcined for 2 hours at 540° C.

The catalyst was placed in a reaction tube of 100 cc. capacity which was placed in a salt bath heated to 362° C.

Upon passing an acrolein-steam-air mixture in a molar ratio of 1:5:5 over such catalyst with a 2 second period of contact, 33.7% of the acrolein supplied was converted to acrylic acid. The total acrolein conversion was 47.5% which corresponded to an acrylic acid yield of 71%. The space-time yield was 75.7 g./l. of catalyst and hour.

EXAMPLE 5

A catalyst was prepared as in Example 4, except that the phosphoric-vanadic acid solution was added to 54 g. of a 30% silica sol. The calcined catalyst was placed in a reaction tube heated to 358° C. in a salt bath.

Upon passing an acrolein-steam-air mixture in a molar ratio of 1:5:5 over such catalyst with a 2 second period of contact, the acrolein conversion was 58.2% and the yield of acrylic acid was 60.6%. The space-time yield was 79.3 g. per liter of catalyst and hour.

We claim:

1. In a process for the catalytic oxidation of $\alpha,\beta$-unsaturated aldehydes in the gas phase with molecular oxygen at temperatures between 200 and 500° C. to form the corresponding $\alpha,\beta$-unsaturated carboxylic acids, the step of carrying out such oxidation with a catalyst consisting of a calcined mixture of phosphoric acid and vanadic acid in which the atomic ratio of phosphorus to vanadium is from 1:10 to 10:1.

2. The process of claim 1 in which said catalyst mixture is supported on silica.

3. The process of claim 1 in which said $\alpha,\beta$-unsaturated adehyde is acrolein.

4. The process of claim 1 in which said $\alpha,\beta$-unsaturated aldehyde is selected from the group consisting of acrolein and methacrolein.

5. In a process for the catalytic oxidation of $\alpha,\beta$-unsaturated aldehydes in the gas phase with molecular oxygen at temperatures between 200 and 500° C. to form the corresponding $\alpha,\beta$-unsaturated carboxylic acid, the step of carrying out such oxidation with a catalyst consisting of a calcined mixture of phosphoric acid and vanadic acid in which the atomic ratio of phosphorus to vanadium is from 1:10 to 10:1 and 1 to 30 mol percent of antimony trioxide with reference to the total amount of phosphorus and vanadium content thereof calculated as phosphorus and vanadium oxide.

6. The process of claim 5 in which the catalyst employed was prepared by mixing aqueous ammonium vanadate, phosphoric acid and antimony trioxide in nitric acid, drying the mixture and the calcining, and in which the $\alpha,\beta$-unsaturated aldehyde is selected from the group consisting of acrolein and methacrolein.

References Cited

UNITED STATES PATENTS 3,419,607  12/1968  Hurst _____ 260—530

FOREIGN PATENTS 1,289,710  2/1962  France _____ 260—533

CHARLES B. PARKER, Primary Examiner

V. GARNER, Assistant Examiner

U.S. Cl. X.R.

252—435